United States Patent Office 3,335,194
Patented Aug. 8, 1967

3,335,194
CYCLOPROPENE DERIVATIVES
Robert C. West, Jr., Madison, Wis., and Stephen W. Tobey, Sudbury, Mass., assignors to Wisconsin Alumni Research Foundation, Madison, Wis., a corporation of Wisconsin
No Drawing. Filed Sept. 21, 1966, Ser. No. 580,858
4 Claims. (Cl. 260—648)

This application is a continuation-in-part of copending application Ser. No. 355,904, filed Mar. 30, 1964, now abandoned.

The present invention relates to cyclopropene derivatives and to processes for making the same and, in particular, to halogenated cyclopropene derivatives.

An object of this invention is to provide a method for preparing cyclopropene derivatives.

A further object is to provide a method for preparing tetrahalogenated cyclopropene derivatives.

A still further object is to provide tetra-halogenated cyclopropenes.

Other objects and advantages will be evident from the following detailed description.

Compounds of this invention can be readily prepared in accordance with the following examples.

Example I

Tetrachlorocyclopropene was prepared in the following manner. (See also Tetrahedron Letters No. 18, 1963, page 1179–1182, (received for publication May 3, 1963), "Tetrachlorocyclopropene and Hexachlorocyclopropane from Pentachlorocyclopropane" by Stephen W. Tobey and Robert West.)

Pentachlorocyclopropane was prepared in isomerically pure form by the decarboxylation of sodium trichloroacetate in dry 1,2-di-methoxyethane at 80° C. in the presence of an excess of trichloroethylene. The resulting pentachlorocyclopropane was shaken with about a fourfold excess of 18 M aqueous potassium hydroxide at a temperature of 80–85° C. A moderately exothermic reaction took place during which tetrachlorocyclopropene was formed and which was subsequently separated by layering (separation into two phase system or the basis of relative specific gravities). Separation of tetrachlorocyclopropene from the reaction mixture can be aided by the addition of 15 M hydrochloric acid in an amount sufficient to give the reaction mixture a pH of about 2. Such acidification is normally carried out at a temperature of about 40° C. If desired, the tetrachlorocyclopropene can, after separation by layering, be further purified by distillation in a nitrogen atmosphere.

The separated product was found to be a colorless lachrymatory liquid having an odor characteristic of rotten tomatoes, a boiling point of 129.5–130.0° C. (745 mm. under nitrogen) and a refractive index $n_D^{27}$ 1.505. The product was identified as tetrachlorocyclopropene from the follownig data:

Calculated, percent: C, 20.26; Cl, 79.74; H, 0.00; M.W. 177.8. Found, percent: C, 20.26; Cl, 79.70; H, 0.00; M.W. 179±3.

Infrared spectrum: Strong bands at 617 cm.$^{-1}$ (C—Cl), 753 cm.$^{-1}$ (CCl$_2$), 1055 cm.$^{-1}$ (C—C), 1148 cm.$^{-1}$ (C—C).

A weak C=C band at 1810 cm.$^{-1}$ is strong and polarized in the Raman spectrum, which along with the observed matching of all Raman and infrared bands in the NaCl region indicates a C$_{2v}$ symmetry for the molecule; and the structure was determined to be:

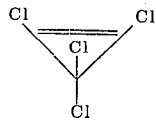

Confirmatory evidence for the above structure is provided by the fact that chlorination of the above compound in ultraviolet light converts its rapidly and quantitatively to hexachlorocyclopropane.

In the foregoing example other concentration of aqueous potassium hydroxide higher and lower than 18 M and temperatures in the range from about 70° to 90° C. can be used with comparable results.

Example II

The corresponding tetrabromocyclopropene was readily prepared by adding boron bromide to tetrachlorocyclopropene at room temperature. Uppon addition to the boron bromide a vigorous instantaneous reaction occurred with the liberation of boron chloride gas. The reaction proceeded as rapidly as the boron bromide was added up to the point where all the tetrachlorocyclopropene was converted ot tetrabromocyclopropene according to the following equation:

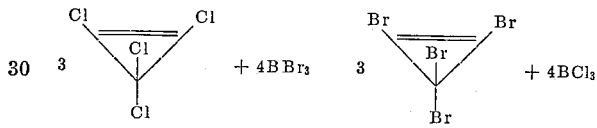

Tetrabromocyclopropene is a colorless liquid which boils in the range from about 55°–65° C. (.02 mm.±.01 mm.) and has a refractive index $n_D^{25.2}$ 1.634. The compound was identified as tetrabromocyclopropene from the following data:

Infrared spectrum: (NaCl region (liquid film)) bands at—1757 cm.$^{-1}$ (medium, sharp) (Cyclopropene C=C), 1135 cm.$^{-1}$ (strong, sharp), 1121 cm.$^{-1}$ (very strong, sharp), 1075 cm.$^{-1}$ (medium, sharp), 1002 cm.$^{-1}$ (very strong, broad), 664 cm.$^{-1}$ (very strong, broad).

Calculated, percent: C, 10.21; Br, 89.99. Found, percent: C, 10.53; Br, 89.01.

Example III

Tetrahalocyclopropenes characterized by having mixed halogen substituents in the molecule were prepared as follows:

Tetrachlorocyclopropene was mixed with antimony trifluoride in the ratio of about four moles of antimony trifluoride to three moles of tetrachlorocyclopropene. A small amount of antimony pentachloride was added to catalyze the reaction. This admixture was then slowly heated and tetrahalocyclopropenes having both fluorine and chlorine were distilled from the reaction mixture and collected. Specifically identified were 1, 2 dichloro, 3,3 difluorocyclopropene having a boiling point of 59° C. and characterized by the structural formula:

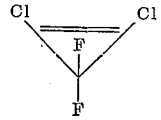

and a mono-fluoro substituted tetrahalocyclopropene having a boiling point in the range from about 80° to 100° C. and characterized by the following structural formula:

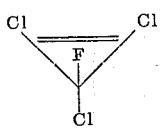

Similar tetrahalocyclopropenes containing mixed halogen substituents comprising iodine and bromine may also be prepared by related methods.

The tetra-halogenated cyclopropenes of this invention are versatile intermediates from which other halogenated cyclopropenes and halogenated cyclopropanes can be readily obtained. Thus, hexachlorocyclopropane, is readily obtainable from tetrachlorocyclopropene as set forth hereinbefore. This compound may find ready application as an anesthetic agent.

Also, because the tetra-halogenated cyclopropene ring system is quite reactive it will undergo a number of ring-opening reactions. For example, when tetrachlorocyclopropene is reacted at about 50°–80° C. with various alcohols, such as methyl, ethyl, n-butyl and isopropyl alcohols, it will form the respective dichloroacrylate esters, various of which are known to have defoliating properties. Tetrabromocylopropene will also readily react with alcohols to form the dibromoacrylate esters which are known to function as flame retardants. Tetrachlorocyclopropene can be reacted with ammonia to form dichloroacrylonitrile, a monomer which can be converted into many useful polymeric forms and dibromoacrylic acid can be readily prepared from the interaction of tetrabromocylopropene and water. The dibromoacrylic acid can be readily esterified to the dibromoacrylate esters which, in turn, can be converted into many useful polymeric forms.

It has also been observed that tetrachlorocyclopropene exhibits insecticidal action in the vapor state. For example, at dosage rates of 500 and 100 milligrams in a closed 12 liter system a 100% mortality was obtained with webbing clothes moths, black carpet beetle larvae, adult confused flour beetles and rice weevils. (See also U.S. Letters Patent No. 3,251,735, issued May 17, 1966.)

It is to be understood that the present invention may be embodied in forms other than those specifically set forth herein and that, therefore, the foregoing specification is not to be defined as limiting the scope of the appended claims.

It is claimed:

1. Cyclopropene compounds having the general formula

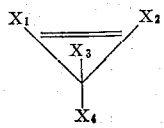

wherein $X_1$, $X_2$, $X_3$ and $X_4$ are each a halogen atom.

2. Tetrachlorocyclopropene.

3. Tetrabromocyclopropene.

4. A process for preparing tetrabromocyclopropene which comprises continuously added boron bromide to tetrachlorocyclopropene at room temperature until the evolution of boron chloride gas ceases, whereby the tetrachlorocyclopropene is converted to tetrabromocyclopropene.

No references cited.

LEON ZITVER, *Primary Examiner.*

M. JACOB, *Assistant Examiner.*